(12) United States Patent
Zehnder et al.

(10) Patent No.: US 7,798,555 B2
(45) Date of Patent: Sep. 21, 2010

(54) MOVABLE ROOF FOR A PASSENGER VEHICLE

(75) Inventors: Frank Zehnder, Hemmingen (DE); Jan Just, Bloomfield Hills, MI (US)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 133 days.

(21) Appl. No.: 12/332,454

(22) Filed: Dec. 11, 2008

(65) Prior Publication Data
US 2009/0146464 A1 Jun. 11, 2009

(30) Foreign Application Priority Data
Dec. 11, 2007 (DE) .................. 10 2007 059 572

(51) Int. Cl.
*B60J 7/08* (2006.01)
(52) U.S. Cl. .................. 296/107.01; 296/108
(58) Field of Classification Search ............ 296/107.01, 296/107.08, 107.17, 108, 116, 117
See application file for complete search history.

(56) References Cited

U.S. PATENT DOCUMENTS

| 5,671,966 | A | 9/1997 | Busch |
| 6,505,881 | B2 * | 1/2003 | Kinnanen .............. 296/107.17 |
| 2002/0034668 | A1 * | 3/2002 | Zhang et al. .................. 429/25 |
| 2003/0034668 | A1 * | 2/2003 | Quindt ....................... 296/108 |

FOREIGN PATENT DOCUMENTS

| EP | 0 819 558 | 1/1998 |
| GB | 683613 | 12/1952 |

* cited by examiner

*Primary Examiner*—Lori L Lyjak
(74) *Attorney, Agent, or Firm*—Brooks Kushman P.C.

(57) ABSTRACT

A roof assembly includes a roof having a roof frame with front, center, and rear sections, and a lever assembly. The lever assembly includes three levers which are respectively linked to three swivel axes on the rear section such that the roof is movable between a closed position and an opened position. The first lever connects the rear section at the first axis to a support such that the rear section is movable about the first axis; the second lever connects the rear section at the second axis to the center section such that the center section is movable about the second axis; and the third lever connects the rear section at the third axis to the front section such that the front section is movable about the third axis. The levers are adjacently situated in a transverse direction with the second lever being between the first and third levers.

20 Claims, 4 Drawing Sheets

MOVABLE ROOF FOR A PASSENGER VEHICLE

CROSS-REFERENCE TO RELATED APPLICATIONS

This application claims foreign priority benefits under 35 U.S.C. §119(a)-(d) to DE 10 2007 059 572.9, filed Dec. 11, 2007, which is hereby incorporated by reference in its entirety.

BACKGROUND OF THE INVENTION

1. Field of the Invention

The present invention relates to movable roofs for vehicles.

2. Background Art

GB 683 613 describes a movable roof having a pair of laterally spaced apart roof frames. Each roof frame has front, center, and rear frame sections which adjoin a side window of a vehicle and are connected to one another by control levers of a lever assembly.

EP 0 819 558 B1 describes a movable roof having a pair of laterally spaced apart roof frames. Each roof frame has front, center, and rear frame sections. The rear frame section is designed as a main pillar and is rotatably mounted on a fixed bearing of a vehicle. A control lever acts between the front and center frame sections, respectively, and the rear frame section. A steering arm, which is a component of a kinematic chain, engages the rear frame section.

DE 44 43 405 A1 (corresponding to U.S. Pat. No. 5,671, 966) describes a drive apparatus for a foldable roof having a main pillar fastened to a vehicle body. A center frame section is articulately connected to the main pillar, and the main pillar and a front frame section cooperate by the interconnection of control levers.

SUMMARY OF THE INVENTION

An object of the present invention is a roof assembly for a vehicle in which the roof assembly includes a roof and a lever assembly for enabling the roof to move between closed and opened positions in which the lever assembly has a simple design and functions well in both of the closed and opened positions with spatially favorable conditions.

In carrying out the above object and other objects, the present invention provides a roof assembly. The roof assembly includes a roof and a lever assembly. The roof has a roof frame provided with a front frame section, a center frame section, and a rear frame section. The lever assembly includes first, second, and third swivel axes on the rear frame section. The lever assembly further includes first, second, and third lever elements which are respectively linked to the first, second, and third swivel axes for movably connecting the frame sections to one another such that the roof is movable between a closed position in which the frame sections extend in a curved manner along a roof line on a given side and an opened position in which the frame sections are aligned side-by-side next to one another beneath the roof line. The first lever element connects the rear frame section at the first swivel axis to a fixed support such that the rear frame section is movable about the first swivel axis. The second lever element connects the rear frame section at the second swivel axis to the center frame section such that the center frame section is movable about the second swivel axis. The third lever element connects the rear frame section at the third swivel axis to the front frame section such that the front frame section is movable about the third swivel axis. The swivel axes extend parallel to a transverse axis and the lever elements are adjacently situated relative to the transverse axis such that the second lever element is between the first and third lever elements relative to the transverse axis, the first lever element is closest to the given side relative to the transverse axis, and the third lever element is farthest from the given side relative to the transverse axis.

Further, in carrying out the above object and other objects, the present invention provides a vehicle having a roof assembly such as the roof assembly described above.

A roof assembly in accordance with embodiments of the present invention includes a roof having a pair of laterally spaced apart roof frames. The roof frames are to adjoin respective side windows of a vehicle. Each roof frame includes a front frame section, a center frame section, and a rear frame section. The roof assembly further includes a lever assembly for each of the roof frames. The lever assemblies cooperate with the roof frames to enable the roof to move between a closed position, in which the roof is to span a passenger compartment of the vehicle, and an opened position, in which the roof is to be folded to be stored in a rear storage compartment of the vehicle. Advantageously, each lever assembly includes three swivel axes. The swivel axes set standards in movable roof technology as the swivel axes may be easily implemented in a vehicle having a movable roof and as the swivel axes require less range of motion and storage space for the corresponding lever assembly. Each lever assembly includes relatively less complicated guide rods which thereby contributes to more advantageous manufacture of the roof. This approach further allows for a reduction in the number of fastening elements thereby optimizing the level of effort for installing the roof.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
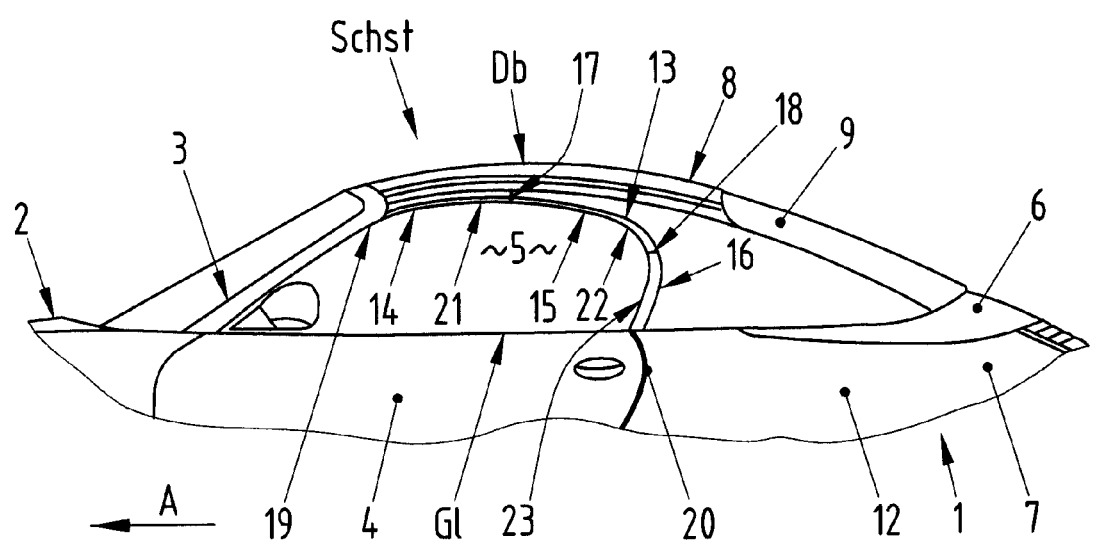
FIG. 1 illustrates an exterior side view of a roof assembly in accordance with an embodiment of the present invention with the roof assembly being in a closed position in which the roof of the roof assembly spans a passenger compartment of a vehicle.
Figure 2:
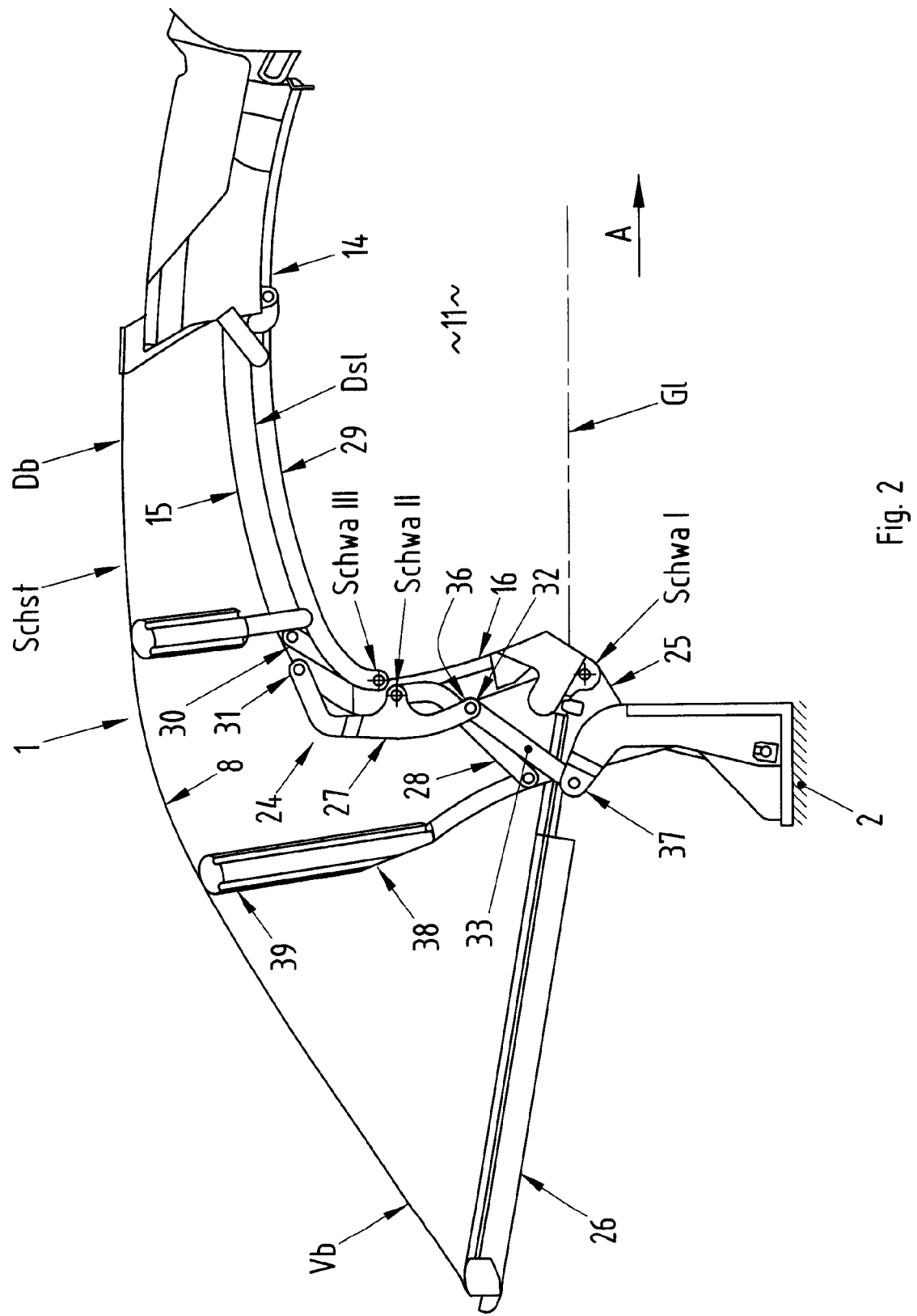
FIG. 2 illustrates an interior side view of the roof assembly with the roof assembly being in the closed position.
Figure 3:
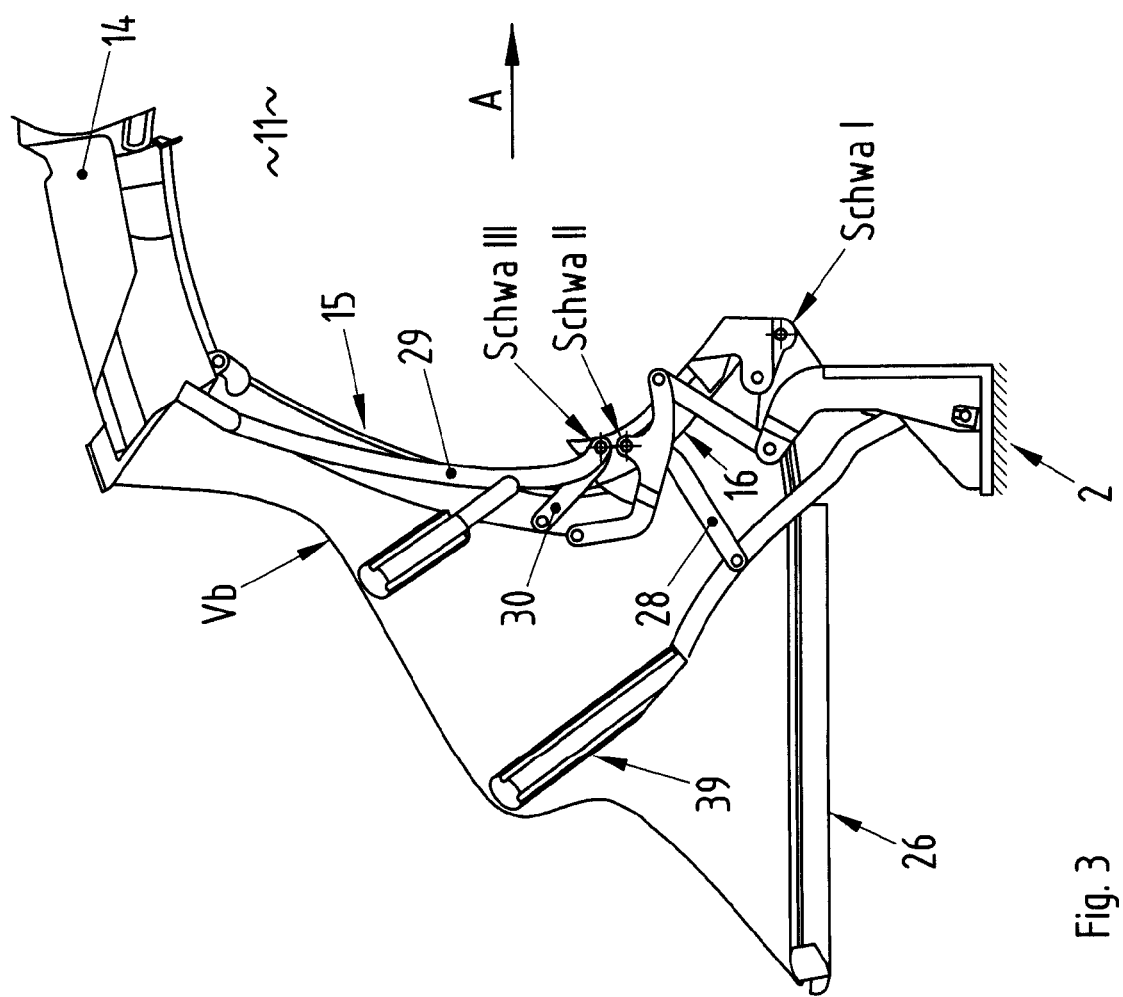
FIG. 3 illustrates an interior side view of the roof assembly with the roof assembly being in an intermediate position between the closed position and an opened position.
Figure 4:
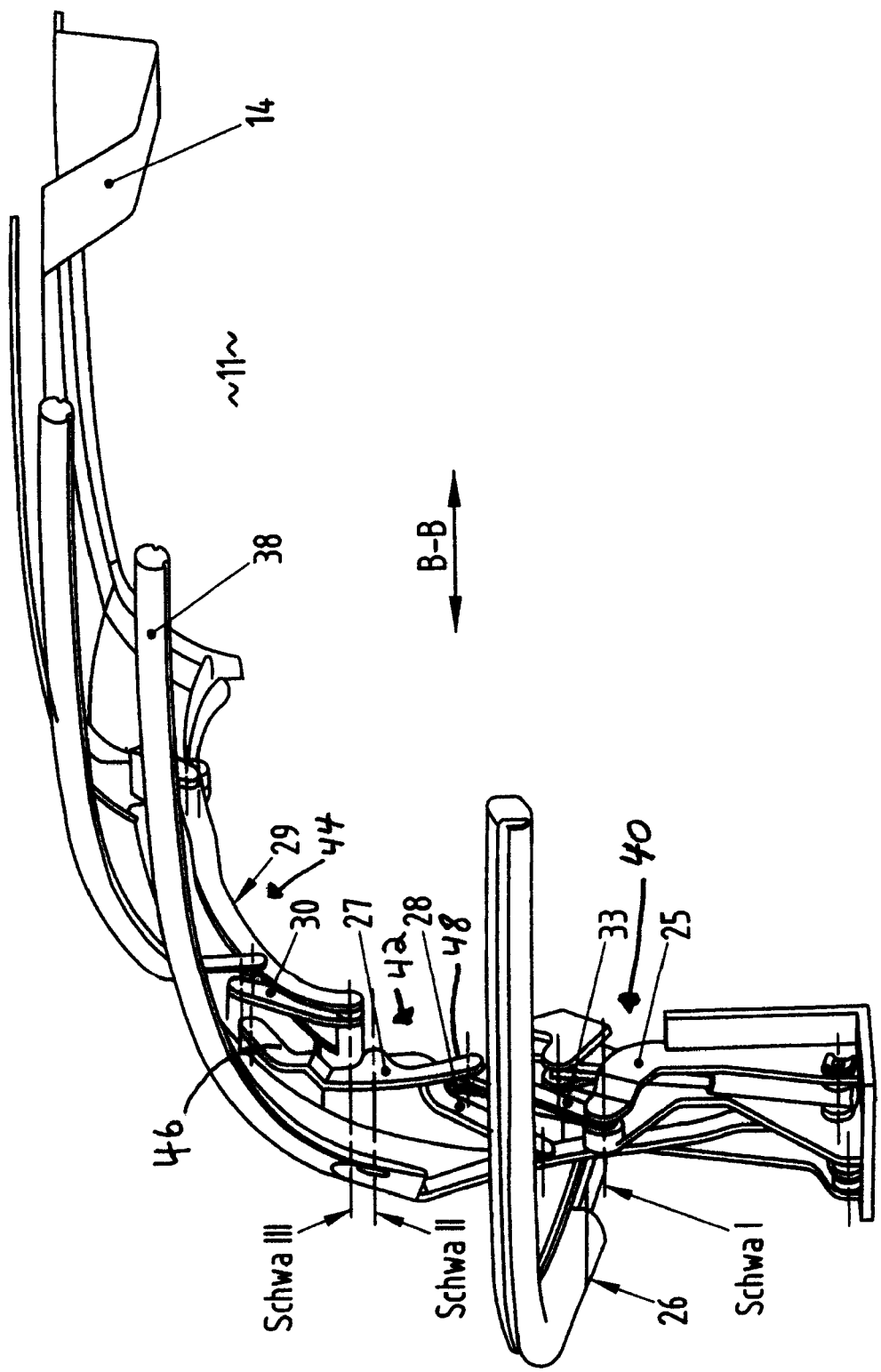
FIG. 4 illustrates an oblique interior side view of the roof assembly.

Referring now to FIGS. 1, 2, 3, and 4, a roof assembly in accordance with an embodiment of the present invention is shown. The roof assembly includes a movable (i.e., foldable) roof 8 having a roof cover Vb. Roof 8 further includes a rear window 9. Roof 8 may be a soft-top roof or a hard shell (i.e., hard top) roof.

The roof assembly is installed on a vehicle 1. Vehicle 1 includes a vehicle body 2 having a windshield frame 3 and a pair of side doors 4. Each side door 4 includes a side window 5. Vehicle 1 includes a passenger compartment 11 which is partially between side doors 4 and side windows 5. Vehicle 1 includes a vehicle base body 7 having a rear storage compartment 12. Storage compartment 12 may be closed and opened by an associated compartment cover 6.

Roof 8 is movable between a closed position Schst and an opened position. In the closed position Schst (shown in FIGS. 1 and 2), roof 8 spans passenger compartment 11. In the opened position, the roof 8 is collapsed and stored in storage compartment 12.

Roof 8 includes a pair of laterally spaced apart movable roof frames. The roof frames are on respective longitudinally extending sides of roof 8. (One roof side Db is shown.) The roof frames include the same components as one another and, thus, only one roof frame 13 is shown in the drawings and described in greater detail herein. Roof frame 13 directly or indirectly supports roof cover Vb. Roof frame 13 is formed by a front frame section 14, a center frame section 15, and a rear frame section 16 (as viewed in the direction of forward vehicle travel A). Front frame section 14 and center frame section 15 abut one another at a front joint 17. Center frame section 15 and rear frame section 16 abut one another at a rear joint 18. Frame sections 14, 15, 16 are situated along a curved roof side line Dsl on a respective longitudinally extending side of roof 8. Roof side line Dsl extends, opposite the direction of forward vehicle travel A, between an upper end region 19 of windshield frame 3 and a belt line Gl approximately in the region of a rear door boundary 20. The belt line Gl is oriented essentially horizontally and separates vehicle base body 7 from roof side Db. Roof side line Dsl has a first relatively flat curved region 21 which adjoins a second relatively narrow curved region 22. Second curved region 22 is shaped such that a third curved region 23 abuts belt line Gl at an essentially obtuse or right angle.

The roof assembly further includes a respective lever assembly for the roof frames. The lever assemblies include the same components as one another and, thus, only one lever assembly 24 is shown in the drawings and described in greater detail herein. Lever assembly 24 is associated with roof frame 13. Lever assembly 24 movably connects roof frame 13 to vehicle 1 to enable roof 8 to move between the closed and opened positions. In particular, lever assembly 24 is interconnected with frame sections 14, 15, 16 to enable the frame sections to move between the closed and opened positions. To this end, lever assembly 24 includes a first swivel axis Schwa I, a second swivel axis Schwa II, and a third swivel axis Schwa III. The swivel axes Schwa I, II, III are on rear frame section 16.

Lever assembly 24 includes lever elements which are respectively linked to the swivel axes Schwa I, II, and III. In particular, a first lever element 40 is linked to first swivel axis Schwa I; a second lever element 42 is linked to second swivel axis Schwa II; and a third lever element 44 is linked to third swivel axis Schwa III. The lever elements 40, 42, and 44 are situated at different positions in the transverse vehicle direction B-B (shown in FIG. 4) with the second lever element 42 being between the first and third lever elements 40 and 44 along the transverse vehicle direction B-B and the third lever element 44 being closest to passenger compartment 11 along the transverse vehicle direction B-B.

The first lever element 42 includes a fulcrum bracket 25 and a tension bracket 26. Fulcrum bracket 25 is rigidly mounted to vehicle body 2. Fulcrum bracket 25 and tension bracket 26 are linked to first swivel axis Schwa I on rear frame section 16.

The second lever element 44 includes a main guide rod 27 and a first control rod 28. Main guide rod 27 and first control rod 28 are linked to second swivel axis Schwa II on rear frame section 16. Main guide rod 27 is connected at one end 31 to center frame section 15 and is connected at another end 32 to an end 36 of a drive rod 33. As such, starting from second swivel axis Schwa II, main guide rod 27 is a two-armed lever having a first lever arm 46 (between second swivel axis Schwa II and end 31) and a second lever arm 48 (between second swivel axis Schwa II and end 32). Drive rod 33 is connected at another end 37 to fulcrum bracket 25.

The third lever element 44 includes a second control rod 29 and a third control rod 30. Control rods 29, 30 are linked to third swivel axis Schwa III on rear frame section 16.

First control rod 28 is mechanically linked to a bow 38. Bow 38 is in the form of a corner bow and has a support region 39 spanning roof cover Vb. Bow 38 is linked to fulcrum bracket 25 and extends obliquely from bottom to top, opposite the direction of forward vehicle travel A, from fulcrum bracket 25 to roof cover Vb.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A roof assembly comprising:
   a roof having a roof frame provided with a front frame section, a center frame section, and a rear frame section; and
   a lever assembly including first, second, and third swivel axes on the rear frame section, the lever assembly further including first, second, and third lever elements which are respectively linked to the first, second, and third swivel axes for movably connecting the frame sections to one another such that the roof is movable between a closed position in which the frame sections extend in a curved manner along a roof line on a given side and an opened position in which the frame sections are aligned side-by-side next to one another beneath the roof line;
   wherein the first lever element connects the rear frame section at the first swivel axis to a fixed support such that the rear frame section is movable about the first swivel axis;
   wherein the second lever element connects the rear frame section at the second swivel axis to the center frame section such that the center frame section is movable about the second swivel axis;
   wherein the third lever element connects the rear frame section at the third swivel axis to the front frame section such that the front frame section is movable about the third swivel axis;
   wherein the swivel axes extend parallel to a transverse axis and the lever elements are adjacently situated relative to the transverse axis such that the second lever element is between the first and third lever elements relative to the transverse axis, the first lever element is closest to the given side relative to the transverse axis, and the third lever element is farthest from the given side relative to the transverse axis.

2. The roof assembly of claim 1 wherein:
   the first lever element includes a fulcrum bracket and a tension bracket both linked to the first swivel axis.

3. The roof assembly of claim 2 wherein:
   the fulcrum bracket is mounted to the fixed support.

4. The roof assembly of claim 3 wherein:
   the second lever element includes a main guide rod and a first control rod which are linked to the second swivel axis.

5. The roof assembly of claim 4 wherein:
the third lever element includes second and third control rods which are linked to third swivel axis.

6. The roof assembly of claim 5 wherein:
the main guide rod is connected at one end to the center frame section and is connected at another end to a drive rod which is movably connected to the fixed support.

7. The roof assembly of claim 5 wherein:
the main guide rod includes first and second lever arms pivotable about the second swivel axis with first lever arm connected to the front frame section and the second lever arm connected to a drive rod which is movably connected to the fixed support.

8. The roof assembly of claim 7 wherein:
the fulcrum bracket is further linked to the fixed support at the point where the drive rod is movably connected to the fixed support.

9. The roof assembly of claim 5 wherein:
the first control rod is mechanically linked to a bow.

10. The roof assembly of claim 9 wherein:
the bow is linked to the fulcrum bracket.

11. A vehicle comprising:
a vehicle body having a passenger compartment and a rear storage compartment, the vehicle body further having a pair of laterally spaced apart side windows on respective sides of the passenger compartment;
a roof having a pair of laterally spaced apart roof frames, each roof frame having front, center, and rear frame sections; and
a pair of lever assemblies respectively associated with the roof frames, each lever assembly having first, second, and third swivel axes on the rear frame section of the associated roof frame, each lever assembly further including first, second, and third lever elements which are respectively linked to the first, second, and third swivel axes for movably connecting the frame sections of the associated roof frame to one another and to the vehicle body such that the roof is movable between a closed position in which the roof spans the passenger compartment with the frame sections of each roof frame extending in a curved manner along the side windows on respective sides of the passenger compartment and an opened position in which the roof and the lever assemblies are stored within the storage compartment;
wherein each first lever element connects the rear frame section of the associated roof frame at the first swivel axis to the vehicle body such that the rear frame section is movable about the first swivel axis, each second lever element connects the rear frame section of the associated roof frame at the second swivel axis to the center frame section of the associated roof frame such that the center frame section of the associated roof frame is movable about the second swivel axis, and each third lever element connects the rear frame section of the associated roof frame at the third swivel axis to the front frame section of the associated roof frame such that the front frame section of the associated roof frame is movable about the third swivel axis;
wherein the swivel axes of each lever assembly extend parallel to a transverse axis and the lever elements of each lever assembly are adjacently situated relative to the transverse axis such that for each lever assembly the second lever element is between the first and third lever elements relative to the transverse axis, the first lever element is closest to a side of the passenger compartment relative to the transverse axis, and the third lever element is farthest from the side of the passenger compartment relative to the transverse axis.

12. A vehicle comprising:
a vehicle body having a passenger compartment and a rear storage compartment;
a roof having a roof frame provided with front, center, and rear frame sections; and
a lever assembly having first, second, and third swivel axes on the rear frame section, the lever assembly including first, second, and third lever elements which are respectively linked to the first, second, and third swivel axes for movably connecting the frame sections to one another and to the vehicle body such that the roof is movable between a closed position in which the roof spans the passenger compartment with the frame sections extending in a curved manner along a side of the passenger compartment and an opened position in which the roof is stored within the storage compartment;
wherein the first lever element connects the rear frame section at the first swivel axis to the vehicle body such that the rear frame section is movable about the first swivel axis, the second lever element connects the rear frame section at the second swivel axis to the center frame section such that the center frame section is movable about the second swivel axis, and the third lever element connects the rear frame section at the third swivel axis to the front frame section such that the front frame section is movable about the third swivel axis;
wherein the swivel axes extend parallel to a transverse axis and the lever elements are adjacently situated relative to the transverse axis such that the second lever element is between the first and third lever elements relative to the transverse axis, the first lever element is closest to the side of the passenger compartment relative to the transverse axis, and the third lever element is farthest from the side of the passenger compartment relative to the transverse axis.

13. The vehicle of claim 12 wherein:
the first lever element includes a fulcrum bracket and a tension bracket both linked to the first swivel axis, wherein the fulcrum bracket is mounted to the vehicle body.

14. The vehicle of claim 13 wherein:
the second lever element includes a main guide rod and a first control rod which are linked to the second swivel axis.

15. The vehicle of claim 14 wherein:
the third lever element includes second and third control rods which are linked to third swivel axis.

16. The vehicle of claim 15 wherein:
the main guide rod is connected at one end to the center frame section and is connected at another end to a drive rod which is movably connected to the vehicle body.

17. The vehicle of claim 15 wherein:
the main guide rod includes first and second lever arms pivotable about the second swivel axis with first lever arm connected to the front frame section and the second lever arm connected to a drive rod which is movably connected to the vehicle body.

18. The vehicle of claim 17 wherein:
the fulcrum bracket is further linked to the fixed support at the point where the drive rod is movably connected to the vehicle body.

19. The vehicle of claim 15 wherein:
the first control rod is mechanically linked to a bow.

20. The vehicle of claim 19 wherein:
the bow is linked to the fulcrum bracket.

* * * * *